(12) United States Patent
Mehari

(10) Patent No.: US 11,339,307 B2
(45) Date of Patent: May 24, 2022

(54) SOLVENT-CONTAINING EMULSIFIED ALKYD RESIN COATING COMPOUND FOR STAIN AND VARNISH COATINGS

(71) Applicant: STO SE & Co. KGaA, Stühlingen (DE)

(72) Inventor: Sem Mehari, Mannheim (DE)

(73) Assignee: STO SE & CO. KGAA, Stuhlingen (DE)

( * ) Notice: Subject to any disclaimer, the term of this patent is extended or adjusted under 35 U.S.C. 154(b) by 0 days.

(21) Appl. No.: 16/883,362

(22) Filed: May 26, 2020

(65) Prior Publication Data

US 2020/0377755 A1 Dec. 3, 2020

Related U.S. Application Data

(60) Provisional application No. 62/853,859, filed on May 29, 2019.

(30) Foreign Application Priority Data

Apr. 16, 2020 (EP) .................................... 20169991

(51) Int. Cl.
| | | |
|---|---|---|
| C09D 173/00 | (2006.01) | |
| C09D 167/08 | (2006.01) | |
| C08K 3/105 | (2018.01) | |
| C08K 3/11 | (2018.01) | |

(52) U.S. Cl.
CPC ......... *C09D 173/00* (2013.01); *C09D 167/08* (2013.01); *C08K 3/105* (2018.01); *C08K 3/11* (2018.01); *C08K 2201/014* (2013.01)

(58) Field of Classification Search
CPC .... C09D 173/00; C09D 167/08; C08K 3/105; C08K 3/11; C08K 2201/014
USPC .......................................................... 524/413
See application file for complete search history.

(56) References Cited

U.S. PATENT DOCUMENTS

| | | | | |
|---|---|---|---|---|
| 4,022,743 A * | 5/1977 | Patella | .................... | C08L 71/02 524/813 |
| 2008/0108762 A1* | 5/2008 | Klaasen | ............... | C09D 167/08 525/539 |
| 2008/0233390 A1* | 9/2008 | Gothlich | ................. | C23C 22/53 428/336 |

* cited by examiner

*Primary Examiner* — Doris L Lee
(74) *Attorney, Agent, or Firm* — Cowan, Liebowitz & Latman, P.C.

(57) ABSTRACT

A solvent-containing coating compound for stains and varnish coatings, in particular for house varnishes or components thereof, containing or consisting of at least one oxidatively drying organic binder, selected from the group consisting of at least one oxidatively drying middle oil and/or long oil alkyd resin, in particular an oxidatively drying long oil alkyd resin, at least one primary drier based on iron, in particular comprising or consisting of at least one organic salt of iron and/or a coordination complex of iron, in particular a complex salt of iron, at least one first secondary drier, in particular comprising or consisting of at least one organic and/or inorganic salt or a compound of zirconium, magnesium, calcium, strontium, barium, zinc, lithium or aluminium, solvent, water, at least one emulsifying agent, optionally, at least one conventional additive.

17 Claims, No Drawings

SOLVENT-CONTAINING EMULSIFIED ALKYD RESIN COATING COMPOUND FOR STAIN AND VARNISH COATINGS

The present invention relates to a solvent-containing emulsified one-component coating compound for stains and varnish coatings based on alkyd resin, and to a coating system containing this solvent-containing emulsified coating compound. The coating compound in accordance with the invention also relates to a coating formed from the coating compound in accordance with the invention as well as to the use of this solvent-containing emulsified coating compound for the production of stains and varnish coatings.

Varnish coatings for interior and exterior applications, for example on metal or wood substrates, have to satisfy many requirements. In addition to an attractive visual appearance, a sufficient resistance as regards mechanical influences is also desirable. In addition, the effects of the weather should not have a negative impact. Furthermore, a regular requirement is that the coating compounds providing these coatings should be easy and trouble-free to apply and in addition, should dry rapidly with the formation of a smooth, high quality surface. Particularly when used in interiors, coating compounds are more and more being required to have a low VOC content and also a low odour.

Solvent-containing alkyd resin coatings are known in the prior art. As an example, they are used in white or coloured varnish on buildings and surfaces and the like, for interiors as well as for exteriors. They should be easy to apply evenly, they should dry quickly and homogeneously and in doing so should form a smooth, uninterrupted surface. In particular, they should also have the desired shade over a long term, i.e. not tend to yellow and discolour.

In the context of the invention, a solvent is a solvent which is suitable for all alkyd resin compositions, with the exception of water.

Known solvent-containing coating compounds based on alkyd resins contain at least one organic solvent, but no substantial quantities of water.

Alternatively, coating compounds may be designed as aqueous systems; water-thinnable protective wood protection stains based on alkyd resins are known, for example. As a rule, the known aqueous systems also contain organic solvents, however in small quantities.

Both water-based as well as solvent-based alkyd resin coating compounds have to comply with the Decopaint guidelines (European Directive 2004/42/CE) regarding their volatile organic compound content.

Drying of solvent-containing coating compounds is usually based on physical and chemical drying or curing processes. For the purposes of initiation and acceleration of the chemical, i.e. oxidative drying using oxygen from the air, organic cobalt salts are often used as what are known as primary driers. In the light of legal requirements which are becoming more and more stringent, one question which arises is whether in the future, cobalt-based driers (siccatives) of this type will still be able to be used in solvent-containing coating compounds because of toxicological considerations.

Furthermore, it is known that when primary driers of this type are used during the oxidative drying process, aldehydes are released. These aldehydes or their degradation products sometimes contribute to the odour and are occasionally also a problem from a health viewpoint.

Furthermore, the use of organic cobalt salts as a siccative, particularly with white or very pale shades, often gives rise to a yellowish or greenish modification to the colour. As an alternative to the cobalt siccative, the use of manganese-based siccatives is known. However, manganese siccatives suffer from the disadvantage that they can lead to colour variations, giving reddish or pink discolourations.

Iron-based primary driers, which are harmless to health, do not result in unwanted variations in shade. However, iron siccatives suffer from the disadvantage that when they are used with the known solvent-containing (water-freewater-free) alkyd resin systems, the drying times obtained are not favourable. Particularly with long oil alkyds, the drying times are much too long and not acceptable for a practical application.

Furthermore, in such coating compounds, silicon dioxide-based matting agents are often employed. Silicon dioxide ($SiO_2$) may also be contained in such coating compounds for other reasons. This is a disadvantage, for the reasons given below.

Thus, it would be desirable to have solvent-containing coating compounds available which are no longer hampered by the disadvantages of the prior art.

Thus, the objective of the present invention is to provide solvent-containing coating compounds for varnish coatings and stains, in particular for house varnishes or components thereof, which provide coatings which dry quickly with low undesirable emissions and/or low odour and which do not change shade, especially a white shade, and which preferably can be easily applied to multiple substrates and which are also suitable for interior applications.

It has now been found that the disadvantages of the known coating systems can be overcome when, instead of cobalt or manganese-based siccatives, those siccatives are employed which are based on iron or iron compounds. This runs counter to the observation that iron-based siccatives in solvent-containing (water-free) alkyd resin coating systems result in drying times that are too long. However, to some extent, iron siccatives function well in water-based alkyd resin varnishes and in them produce satisfactory drying times. An influence of the polarity of water as the solvent on the effectiveness of the siccative can be assumed here.

Aqueous systems of this type have other, usually poorer properties as regards application, visual appearance and protective function, so that they are not always suitable as a replacement for solvent-based alkyd resin coating compounds which generally do not have a substantial water content.

However, it has surprisingly been shown that the use of iron-based siccatives in solvent-containing coating compounds based on alkyd resins also does not lead to any disadvantages as regards the drying time, if the coating compound has a minimum water content. In order to achieve this objective, the solvent-containing alkyd resin coating compound is provided with a water content which is higher than in the prior art and preferably is at least 4.0% by weight with respect to the total weight of the coating compound. Preferably, this solvent-containing alkyd resin coating compound is transformed into a "water-in-oil" emulsion.

Accordingly, a solvent-containing emulsified one-component coating compound has been found, containing or consisting of
- at least one oxidatively drying organic binder, selected from the group consisting of at least one oxidatively drying short oil, middle oil or long oil alkyd resin, in particular an oxidatively drying long oil alkyd resin,
- at least one primary drier based on iron, in particular comprising or consisting of at least one organic salt of iron and/or a coordination complex of iron, in particular a complex salt of iron, at least one secondary drier, in particular comprising or consisting of at least one organic salt of zirconium, strontium, calcium, magnesium, barium, zinc, lithium or aluminium, solvent, water, at least one emulsifying agent, and optionally, at least one conventional additive.

The action of the primary drier is based on carrying out a redox-active catalysis cycle during which the metal cations pass through several oxidation stages, and oxygen of the air forms radicals via peroxides.

In iron primary driers, these redox processes usually function well in water-containing and aqueous (polar) systems, but in contrast, function poorly or not at all in solvent-containing (water-free) systems.

Suitable primary driers based on iron comprise organic salts of the iron as well as metallic soaps of the iron. In this regard, preferred metallic soaps are salts based on cationic iron species and fatty acids, in particular synthetic fatty acids. Examples of suitable fatty acids which may be mentioned are hydroxystearates, behenates, arachinates, palmitates and laurates.

Suitable coordination complexes of the iron, in particular complex salts, are based, for example, on 3,7-diaza-bicyclo[3.3.1]nonane ligands. A particularly suitable example which may be mentioned is iron(2+)-chloro(dimethyl-9,9-dihydroxy-3-methyl-2,4-di-(2-pyridyl)-7-(pyridin-2-ylmethyl)-3,7-diazabicyclo[3.3.1]nonan-1,5-dicarboxylate) chloride. Its production is disclosed in WO 2011/095308 A1.

Primary driers based on iron are commercially available, for example from the manufacturing company Borchers GmbH.

The content of iron primary drier is generally (with respect to the metallic fraction) 0.0001-0.3% by weight, preferably 0.0001-0.1% by weight, more preferably 0.0001-0.05% by weight.

It has been shown that, in solvent-containing one-component coating compounds based on alkyd resins, when using a siccative comprising at least one organic salt of iron and/or a coordination complex of iron, with at least one oxidatively drying organic binder selected from the group consisting of at least one oxidatively drying middle oil and/or long oil alkyd resin, in particular an oxidatively drying long oil alkyd resin, good drying properties with very low-odour and discolouration-free coatings may be obtained.

Particularly good drying properties combined with excellent colour stability of the coatings are generally associated with the use of at least one iron primary drier together with at least one first secondary drier preferably comprising at least one organic and/or inorganic salt or a compound of zirconium, magnesium, calcium, strontium, barium, zinc, lithium or aluminium.

The secondary drier content is generally (with respect to the metallic fraction) 0.01-3.0% by weight, preferably 0.05-2.0% by weight, more preferably 0.1-1.6% by weight, with respect to the total weight of the coating compound. When using a first and a second secondary drier, their respective contents are half of these values.

Particularly suitable coating compounds in accordance with the invention comprise at least one second secondary drier comprising or consisting of at least one organic salt of calcium, zinc, zirconium and any mixture thereof. Particularly satisfactory results are regularly obtained when an organic salt of calcium is used as what is known as the "through drier" in addition to an organic salt of zirconium, what is known as the "auxiliary drier".

In this regard, in a particularly suitable embodiment, the organic salt of the secondary drier comprises neodecanoates, oleates, stearates, palmitates, octoates and/or naphthenates, in particular neodecanoates, particularly preferably zirconium neodecanoates.

The compositions in accordance with the invention are preferably substantially free from cobalt and manganese compounds, in particular free from siccatives based on cobalt and manganese. "Substantially" as used here preferably means cobalt and manganese contents (with respect to the metallic fraction) of less than 0.01 by weight, especially less than 0.001% by weight, with respect to the total weight of the composition. Particularly preferably, the compositions contain no cobalt or manganese compounds which can be detected with conventional analytical methods such as EDX, WDX and/or AAS. In the case of the oxidatively drying organic binder, preferably, the binders employed are those which are selected from the group formed by at least one oxidatively drying middle oil and/or long oil alkyd resin, in particular an oxidatively drying long oil alkyd resin, at least one oxidatively drying modified, in particular isocyanate-modified or amine-modified, middle oil and/or long oil alkyd resin, in particular an oxidatively drying modified long oil alkyd resin, and any mixture thereof.

The alkyd resin content of the composition, optionally including thixotropic alkyd resins, is generally 10-80% by weight, preferably 12-60% by weight, more preferably 14-50% by weight, with respect to the total weight of the composition.

In a particularly advantageous embodiment, the oxidatively drying long oil alkyd resins are employed. In the context of the present invention, the term "long oil alkyd resin" should be understood to mean those long oil systems which have an oil content or oil length of over 60%. The term "short oil alkyd resin", in contrast, should be understood to mean those short oil compounds which have an oil content or an oil length that is regularly in the range 20-40%. The term "oil content" or "oil length" as used herein should be understood to mean, with respect to the total weight of the alkyd resin, the percentage fraction of those fatty acids including polyol residues which are bonded to the hydroxy groups of the polyol unit in the alkyd resin. Thus, in the context of the present invention, the terms "oil content" and "oil length" are used synonymously.

In addition to the at least one oxidatively drying organic binder selected from the group consisting of at least one oxidatively drying middle oil and/or long oil alkyd resin, particularly suitable coating compounds in accordance with the invention furthermore contain at least one oxidatively drying modified middle oil and/or long oil alkyd resin. Preferred oxidatively drying modified middle oil and long oil alkyd resins may in this case be selected from the group consisting of siliconized alkyd resins, acrylated alkyd resins, isocyanate-modified alkyd resins and any mixtures thereof.

Furthermore, in the context of the long oil fraction of the oxidatively drying long oil alkyd resins, these may be based on linoleic acid, linolenic acid and/or oleic acid, optionally with the addition of palmitic acid. Among the oxidatively drying long oil alkyd resins, those which are particularly preferred in respect of achieving the objective of the invention are those which, determined in accordance DIN 53241-1, have an iodine value that is no greater than 120, in particular no greater than 100, preferably in the range of 20 to 120 or 20 to 100, preferably in the range of 40-80, respectively with respect to 100% of the solids of the binder.

The long/middle oil alkyd resins are usually used in the coating compounds in accordance with the invention dissolved in hydrocarbons, in particular in dearomatized or isoparaffinic hydrocarbons.

Preferably at least one, in particular substantially aromatics-free aliphatic hydrocarbon is used as the solvent for the solvent-containing coating compound in accordance with the invention, preferably from the group consisting of, in particular, dearomatized white spirit, n-paraffins, isoparaffins, cycloparaffins and any mixtures thereof. Optionally, methoxypropoxypropanol may also be added as a co-solvent. Particularly preferably, dearomatized aliphatic hydrocarbons are employed. The solvent is normally present in the coating compound in accordance with the invention in a quantity in the range from 10 to 40% by weight, preferably in the range from 15 to 45% by weight. Frequently, in particular in order to improve the dilution properties and for the purposes of obtaining a good processing viscosity, methoxypropoxypropanol is added as a co-solvent, for example in a quantity in the range from 0.5% to 8% by weight, preferably in the range from 1 to 5% by weight.

In the context of the present invention, the term "aromatics-free" should be understood to mean those solvents or hydrocarbons which belong to TRGS 900 Group 1 according to the TRGS900 definition. In particular, in accordance with the VDL guidelines on house paints (Richtlinien zur Deklaration von Inhaltsstoffen in Bautenlacken, Bautenfarben und verwandten Produkten) [Guidelines to the Declaration of the Ingredients in House Varnishes, House Paints and Related Products] VDL-RL01 (6$^{th}$ revision) from the Verband der deutschen Lack- and Druckfarbenindustrie e.V. [German Paint Industry Federation], those solvents or aliphatic hydrocarbons which result in coatings formed from the coating compounds in accordance with the invention should also be free from aromatics within the meaning of the present invention and have an aromatics content of less than 1% by weight, determined in accordance with DIN 55683. More preferably, in the context of the present invention, the term "aromatics-free" should be understood to mean those solvents or aliphatic hydrocarbons which have an aromatics content of less than 0.2% by weight, preferably less than 0.1% by weight.

The composition contains at least one emulsifying agent, preferably a polymeric emulsifying agent and particular preferably an emulsifying agent based on a film-forming polysaccharide resin. Emulsifying agents of this type are thus preferred, inter alia, because they are "bio-based", i.e. based on naturally occurring materials, or resemble such materials. In addition, emulsifying agents of this type are solids which cannot be emitted per se as VOCs or contribute to VOC emissions. They are firmly embedded in the matrix and thus are practically "polymerized into" it. The use of polymeric, preferably film-forming emulsifying agents of this type means that the VOC content in the coating can be reduced in an advantageous manner, because the alkyd resin system can now be diluted with water, and thus a portion of the solvent can be replaced by water.

At the same time, the use of these emulsifying agents reduces the tendency of the alkyd product to yellow.

Examples of suitable emulsifying agents of this type are available, for example, under the trade name Lorama LPR.

These emulsifying agents are preferably in the form of a colloidal dispersion (solid-in-liquid). The solids content in the dispersion is generally between 15 and 60% by weight, preferably between 18 and 50% by weight and particularly preferably between 30 and 48% by weight.

The emulsifying agent is preferably used in a quantity for use of 0.1-10% by weight, preferably 0.2-8% by weight, more preferably 0.25-5% by weight, with respect to the total quantity of the composition.

The composition contains water in order to form a "water-in-oil" emulsion; the water content is generally 2-40% by weight, preferably 3-35% by weight, more preferably 4-30% by weight, most preferably 4-10% by weight.

Advantageous coating compounds in accordance with the invention are also characterized by the fact that they furthermore contain at least one anti-skinning agent. The anti-skinning agents usually act as reducing or complexing agents and prevent the premature curing of the surface of the coating compound in the pots. Preferred anti-skinning agents may be selected in this regard from the group consisting of substituted phenols, dialkylaminoethanol, in particular dimethylaminoethanol and/or diethylaminoethanol, dialkylhydroxylamine, in particular dimethylhydroxylamine and/or diethylhydroxylamine, dibenzylhydroxylamine, hydroxylamine, diethylamine, triethylamine, ketoximes, in particular acetoxime, butanoxime, pentanoxime and any mixtures thereof.

The content of anti-skinning agents, matting agents, light stabilizers, radical scavengers, etc. in the composition is generally 0.1-8.0% by weight, preferably 0.2-6.0% by weight, more preferably 0.3-5.0% by weight, with respect to the total weight of the composition.

For some applications, it has been shown to be advantageous to provide the coating compound in accordance with the invention with at least one rheology modifying agent. Preferably, no thickeners selected from the group consisting of modified or unmodified phyllosilicates such as bentonites are used. Preferably, the term "rheology modifying agent" encompasses thixotropic alkyd resins.

In the context of the present invention, the term "thixotropic alkyd resins" encompasses, for example, those alkyd resins which originate from a partial reaction of polyamides from polymeric fatty acids and polyamides with alkyl resins, what are known as polyamide-modified alkyd resins. Furthermore, polyurea-modified alkyd resins, also known as polyurea thixotropic alkyd resins, may be used as the thixotropic alkyd resins in the context of the invention. Examples of suitable thixotropic alkyd resins are described in EP 0 922 738 B1. With the aid of these rheology modifying agents, in particular with the aid of thixotropic alkyd resins, the stability of the coating films obtained with the coating compounds in accordance with the invention can be further improved.

The thixotropic alkyd resin content is generally 0.1-20% by weight, preferably 0.5-15% by weight, more preferably 1.0-12% by weight, with respect to the total weight of the composition, preferably as a part of the total alkyd resin content.

For many applications, the coating compounds in accordance with the invention may furthermore contain at least one filler, in particular selected from the group consisting of carbonates, in particular calcium carbonate, magnesium carbonate and dolomite, sulphates, in particular barium sulphate, and oxides such as aluminium oxide, as well as mixtures thereof.

However, it has now been shown that, especially with low water contents, the presence of $SiO_2$ and $SiO_2$-based compounds has a deleterious effect on the drying times. The iron siccatives no longer work as effectively as expected; the drying times become significantly longer. It appears that the reversibility of the oxidation and reduction processes for the iron in its various oxidation states is inhibited or even blocked on the surface of $SiO_2$ particles, for example amorphous silicas. Oxidation state 3 for iron is known to be stabilized on $SiO_2$ surfaces. A reduction to Fe(II) is made more difficult. It is only with the addition of larger amounts of water to the solvent-containing alkyd resin coating composition that it appears that the $SiO_2$ surfaces become at least partially "deactivated", so that the unwanted interactions between the iron siccative and the $SiO_2$ surface are reduced.

Because of this interaction of the iron siccative with $SiO_2$ surfaces, the coating compounds in accordance with the invention are therefore substantially free from silicon dioxide-based, amorphous fillers such as silica, silica gel, amorphous $SiO_2$, microsilica and/or glasses, which are also used as a matting agent. Advantageously again, they contain no crystalline fillers based on $SiO_2$, such as quartz or cristobalite, if these fillers are in a very finely divided form, i.e. with a mean particle size D50 of less than 10 μm (determined in accordance with ISO 13320). This is also the case for other silicate fillers, in particular silicates such as feldspar, pyrophyllite and serpentine, as well as mixtures thereof, when their silica dioxide content is more than 60% by weight with respect to the molar mass of the silicate filler.

In the context of this invention, the term "silicon dioxide-based" means a $SiO_2$ percentage by weight of more than 90% by weight with respect to the total molar mass of the relevant substance. "Substantially free" as used in this context means less than 1.0% by weight with respect to the total weight of the coating compound, preferably less than 0.5% by weight with respect to the total weight of the coating compound, more preferably less than 0.1% by weight with respect to the total weight of the coating compound, most preferably below the analytical threshold for detection, for example using XRD and/or EDX.

In many embodiments of the coating compounds in accordance with the invention, matt coatings can be obtained with them. In many cases, however, it has been shown to be advantageous to obtain a matt appearance of the coating surface by also adding at least one matting agent to the coating compound in accordance with the invention. In general, silica, in particular precipitated silica, pyrogenic silica, amorphous silica and particularly preferably post-treated precipitated silica are frequently used as the matting agent. These silicas should not be contained in the coating compounds in accordance with the invention for the reasons outlined above. Within the meaning of the analytical threshold for detection, the coating compound in accordance with the invention should be free from these $SiO_2$ compounds. Waxes, in particular polyolefin waxes such as polyethylene or polypropylene waxes, are preferred suitable matting agents, preferably with a D90 particle size, determined in accordance with ISO 13320, in the range 5-15 μm. Such waxes are employed in contents of 0.2-7.5% by weight, preferably 0.3-5.5% by weight, more preferably 0.4-4.5% by weight, with respect to the total weight of the composition.

For the purposes of suitable colour adjustment, as a rule, the coating compounds in accordance with the invention are, as an alternative or in addition, also provided with at least one colorant. Preferred colorants that are employed are pigments (white or coloured pigments). Of the white pigments, titanium dioxide is preferred.

The pigments/colorants content is generally 0.1-50% by weight, preferably 0.2-45% by weight, more preferably 0.5-40% by weight, with respect to the total weight of the composition.

Compositions in accordance with the invention preferably have a pigment-volume concentration (PVC) according to EN ISO 4618-1 of 0 to 50%, more preferably 2 to 45%, particularly preferably 4 to 40%.

In an advantageous embodiment of the coating compounds in accordance with the invention, the additives are selected from the group consisting of defoaming agents, deaerators, thickening agents, light stabilizers, radical scavengers, wetting agents/dispersing agents, slip additives/free flow additives, surface additives, in particular silicone surface additives, for example polyether-modified polymethylalkylsiloxane and/or silicone polyether copolymers and/or surface active polyacrylates, waxes and/or surface active polyacrylates and any mixtures of these compounds.

Suitable light stabilizers that may be used are what are known as HALS-compounds (hindered amine light stabilizers). These compounds frequently provide very good weather resistance and frequently too, this is also accompanied by reduced chalking. Light stabilizers may, for example, be employed in a quantity in the range of 0.1 to 2.0% by weight, preferably in the range 0.2 to 1.0% by weight, respectively with respect to the total weight of the coating compound.

Wetting and dispersing agents may be added to the coating compounds in accordance with the invention in order to stabilize the pigments and/or fillers and, for example, to prevent sedimentation of pigments and fillers. As a rule, wetting and dispersing agents contribute to ensuring that the pigments and/or fillers do not re-agglomerate. Adding wetting and dispersing agents leads to improved stability upon storage. The dispersibility may also be improved because with the aid of wetting and dispersing agents, the pigments are stabilized or agglomeration is prevented. Furthermore, the wetting and/or dispersing agents may, for example, assist in improving covering power. Suitable wetting agents include, for example, the salts of unsaturated polyamides and/or the salts of acidic polyesters, in particular of low molecular weight acidic polyesters.

Polysiloxanes may, for example be employed as defoaming agents. Suitable foam-destroying or foam-preventing polysiloxanes are known to the person skilled in the art.

The coating compounds in accordance with the invention are above all suitable for use as house varnishes or as components thereof. The coating compound in accordance with the invention may be a primer, topcoat coating compound or a transparent or semi-transparent final coating compound or a component thereof. These coating compounds may be used in interiors and exteriors.

The coating compound in accordance with the invention may be employed in what are known as 1-pot coating compounds. In this regard, they may be used both as a primer and also as a middle layer as well as a final coat. Also of particular advantage is the fact that the coating compounds in accordance with the invention are entirely without siccatives based on cobalt and/or lead, and at the same time have an excellent drying profile. By means of the coating compounds in accordance with the invention, systems are obtained which are highly stable upon storage, which do not tend to gel even after storage for a long period.

The coating in accordance with the invention has an average, in particular absolute dry layer thickness, determined in accordance with DIN EN ISO 2808-2 (May 2017), of not more than 100 μm, preferably not more than 80 μm and particularly preferably in the range of 5 to 60 μm.

The solvent-containing emulsified coating compound in accordance with the invention may be produced in a one-pot reaction which is routine for the person skilled in the art. The components are mixed in a reaction vessel in a suitable sequence.

However, in a preferred embodiment, a portion of the alkyd resin binder is transferred into a separate aqueous emulsion so that a water-in-oil emulsion is formed as a semi-finished product or precursor. This emulsion is then combined with a conventional solvent-containing (water-free) alkyd resin formulation in order to form the coating compound in accordance with the invention. The water-in-oil emulsion as a semi-finished product contains the alkyd resin, solvent, emulsifier and water as well as optional additives such as defoaming agent and deaerator, etc. The semi-finished product is stable upon storage and can be produced in stock quantities.

General Coating Compound Composition:
Alkyd Resin
  10-80% by weight, preferably 12-60% by weight, more preferably 14-50% by weight
Thixotropic Alkyd Resin
  0.1-20% by weight, preferably 0.5-15% by weight, more preferably 1.0-12% by weight
Fillers
  0-40% by weight, preferably 0-35% by weight, more preferably 0-30% by weight
Pigments/Colorants
  0.1-50% by weight, preferably 0.2-45% by weight, more preferably 0.5-40% by weight
Additives: wetting agents/dispersing agents, deaerators, defoaming agents, slip additives/free flow additives, anti-skinning agents, matting agents, light stabilizers, radical scavengers, etc.
  0.1-8.0% by weight, preferably 0.2-6.0% by weight, more preferably 0.3-5.0% by weight
Solvent
  1.0-40% by weight, preferably 2.0-35% by weight, more preferably 3.0-30% by weight
Iron Primary Drier (with Respect to the Metallic Fraction)
  0.0001-0.3% by weight, preferably 0.0001-0.1% by weight, more preferably 0.0001-0.05% by weight
Secondary Drier (with Respect to the Metallic Fraction)
  0.01-3.0% by weight, preferably 0.05-2.0% by weight, more preferably 0.1-1.6% by weight
Water
  2-90% by weight, preferably 3-70% by weight, more preferably 4-50% by weight, most preferably 4-10% by weight
Emulsifying Agent
  0.1-10% by weight, preferably 0.2-8% by weight, more preferably 0.25-5% by weight.

EXEMPLARY EMBODIMENT 1

White Varnish, Satin Finish: In Accordance with the Invention

| | |
|---|---|
| Alkyd resin | 20% by weight |
| Thixotropic alkyd resin | 2% by weight |
| Water | 8% by weight |
| Emulsifying agent | 1% by weight |
| Fillers | 16% by weight |
| Pigments/colorants | 32% by weight |
| Additives: wetting agents/dispersing agents, deaerators, defoaming agents, slip additives/free flow additives, anti-skinning agents, light stabilizers, radical scavengers, etc. | 4.8% by weight |
| Matting agent (PE-wax) | 3.0% by weight |
| Solvent | 12.8% by weight |
| Iron primary drier (with respect to the metallic fraction) | 0.0003% by weight |
| Zirconium siccative (auxiliary drier) | 0.2% by weight |
| Calcium siccative (through drier) | 0.2% by weight |

White Varnish, Satin Finish: Reference Example 1

| | |
|---|---|
| Alkyd resin | 24% by weight |
| Thixotropic alkyd resin | 2% by weight |
| Fillers | 16% by weight |
| Pigments/colorants | 32% by weight |
| Additives: wetting agents/dispersing agents, deaerators, defoaming agents, slip additives/free flow additives, anti-skinning agents, light stabilizers, radical scavengers, etc. | 4.8% by weight |
| Matting agent (amorphous silica) | 3.0% by weight |
| Solvent | 17.8% by weight |
| Iron primary drier (with respect to the metallic fraction) | 0.0003% by weight |
| Zirconium siccative (auxiliary drier) | 0.2% by weight |
| Calcium siccative (through drier) | 0.2% by weight |

Reference Example 1 contained no water and therefore also contained no emulsifier. The matting agent polyethylene wax was exchanged for amorphous silica.

In Reference Example 2, in the formulation in accordance with the invention for the satin finish white varnish, the polyethylene wax matting agent was exchanged for amorphous silica; in addition, instead of the iron primary drier, a conventional cobalt primary drier was employed in the usual quantity.

The coating compounds (in accordance with the invention, Reference Example 1 and Reference Example 2) were applied with a 75 μm doctor blade and tested with a Drying Recorder.

The coating composition in accordance with the invention was sufficiently dry after approximately 3.5 hours; that of Reference Example 2 after approximately 8 hours. In contrast, Reference Example 1 was still not dry after 24 hours, and so the test was stopped.

Exemplary Embodiment 2

White Surface Varnish: In Accordance with the Invention

| | |
|---|---|
| Alkyd resin | 28% by weight |
| Thixotropic alkyd resin | 12% by weight |
| Water | 14% by weight |
| Emulsifying agent | 2% by weight |
| Pigments/colorants | 8% by weight |
| Additives: wetting/dispersing agents, deaerators, defoaming agents, slip additives/free flow additives, anti-skinning agents, light stabilizers, radical scavengers, etc. | 3.6% by weight |
| Matting agent | 2.0% by weight |
| Solvent | 30% by weight |
| Iron primary drier (with respect to the metallic fraction) | 0.0004% by weight |
| Zirconium siccative (auxiliary drier) | 0.25% by weight |
| Calcium siccative (through drier) | 0.15% by weight |

The coatings obtained from the coating compounds in accordance with the invention did not display any tendencies to discolouration. It is also of practical relevance to obtain film hardnesses with the coating compounds in accordance with the invention, as usually obtained when employing conventional cobalt-based primary driers.

A further advantage of the coating compounds in accordance with the invention is the reduction in the VOC content. Less solvent has to be used, because a portion thereof is substituted with water. As a matter of fact, for example, with the coating compounds in accordance with the invention for decorative applications, VOC values of less than 300 g/L were obtained. In order to determine the volatile organic compounds content (VOC content), DIN EN ISO standard 11890-1 (September 2007) may be employed.

What is claimed is:

1. A solvent-containing coating compound for varnish coatings and stains for house varnishes or components thereof, containing or consisting of
   at least one oxidatively drying organic binder, selected from the group consisting of at least one oxidatively drying middle oil and/or a long oil alkyd resin;
   at least one primary drier based on iron, comprising or consisting of at least one organic salt of iron and/or a coordination complex of iron;
   at least one first secondary drier comprising or consisting of at least one organic and/or inorganic salt or a compound of zirconium, magnesium, calcium, strontium, barium, zinc, lithium or aluminium, solvent, water; and
   at least one emulsifying agent based on a film-forming polysaccharide resin in a quantity for use of 0.1-10% by weight.

2. A solvent-containing coating compound for varnish coatings and stains for house varnishes or components thereof, containing or consisting of
   at least one oxidatively drying organic binder, selected from the group consisting of at least one oxidatively drying middle oil and/or a long oil alkyd resin;
   at least one primary drier based on iron, comprising or consisting of at least one organic salt of iron and/or a coordination complex of iron;
   at least one first secondary drier comprising or consisting of at least one organic and/or inorganic salt or a compound of zirconium, magnesium, calcium, strontium, barium, zinc, lithium or aluminium, solvent, water; and
   at least one emulsifying agent,
   wherein the coating compound has a water content of 2-40% by weight.

3. The coating compound as claimed in claim 2, wherein the coating compound is substantially free from siccatives based on cobalt and manganese.

4. The coating compound as claimed in claim 2, wherein the oxidatively drying organic binder further comprises at least one oxidatively drying modified middle oil and/or a long oil alkyd resin selected from the group consisting of siliconized alkyd resins, acrylated alkyd resins, isocyanate-modified alkyd resins and any mixtures thereof.

5. The coating compound as claimed in claim 2, wherein the solvent comprises or consists of aromatics-free aliphatic hydrocarbons selected from the group consisting of dearomatized white spirit, n-paraffins, isoparaffins, cycloparaffins and any mixtures thereof, and contains methoxypropoxypropanol as a co-solvent.

6. The coating compound as claimed in claim 2, further comprising: an additive selected from the group consisting of defoaming agents, light stabilizers, radical scavengers, wetting agents, dispersing agents, silicone surface additives comprising polyether-modified polymethylalkylsiloxane and/or silicone polyether copolymers and/or surface active polyacrylates, waxes, and any mixtures of these compounds.

7. The coating compound as claimed in claim 2, characterized in that the coating compound is substantially free from amorphous silicon dioxide and SiO2 based compounds.

8. The coating compound as claimed in claim 2, wherein the fraction of the primary drier based on iron, with respect to its metallic fraction, is in the range of 0.0001 to 0.3 percent by weight with respect to the total weight of the coating compound, the fraction of the at least one first secondary drier comprising or consisting of at least one organic salt of zirconium, strontium, calcium, magnesium, barium, zinc, lithium and/or aluminium, with respect to its metallic fraction, is in the range of 0.005 to 1.5 percent by weight with respect to the total weight of oxidatively drying organic binder, and/or in that the fraction of the at least one second secondary drier comprising or consisting of at least one organic salt of calcium, lithium, zirconium and any mixture, with respect to its metallic fraction, is herein in the range of 0.005 to with respect to the total weight of oxidatively drying organic binders, and/or in that the fraction of solvent is in the range of 0.1 to 40 percent by weight with respect to the total weight of the coating compound.

9. The coating compound as claimed in claim 2, further comprising:
   at least one colorant, wherein the coating compound has with a pigment-volume concentration (PVC) according to EN ISO 4618-1 of 0 to 50%.

10. The coating compound as claimed in claim 2, wherein the at least one oxidatively drying organic binder comprises the long oil alkyd resin, and the long oil alkyd resin is an oxidatively drying long oil alkyd resin, and wherein the coordination complex of iron—is a complex salt of iron.

11. The coating compound as claimed in claim 2, further comprising:
   at least one conventional additive.

12. The coating compound as claimed in claim 2, further comprising
   at least one second secondary drier comprising or consisting of at least one organic salt of calcium, zirconium and any mixture thereof, wherein the first and the second secondary drier are different.

13. The coating compound as claimed in claim 12, wherein the organic salt of the first and/or second secondary driers comprises neodecanoates, oleates, stearates, palmitates, octoates and/or zirconium neodeconoate and/or strontium neodecanoate.

14. The coating compound as claimed in claim 2 wherein the long oil fraction of the oxidatively drying long oil alkyd resins is based on linoleic acid, linolenic acid, oleic acid and palmitic acid, and/or in that the middle oil fraction of the oxidatively drying middle oil alkyd resins is based on linoleic acid, linolenic acid and/or oleic acid.

15. The coating compound as claimed in claim 14 wherein the middle oil fraction of the oxidatively drying middle oil alkyd resins is further based on the addition of linoleic acid, linolenic acid, oleic acid and palmitic acid.

16. A coating on a substrate having a cover coating, primer, primer-/topcoat-1-pot coating or transparent or semi-transparent final coating, obtained or obtainable by application of, and physical or chemical drying of, the coating compound in accordance with claim 2.

17. The coating as claimed in claim 16, wherein the coating has an average, dry layer thickness determined in accordance with DIN EN ISO 2808-2 (May 2017), which is not over 100 μm.

* * * * *